US012224978B2

(12) United States Patent
Xu et al.

(10) Patent No.: US 12,224,978 B2
(45) Date of Patent: Feb. 11, 2025

(54) PACKET PROCESSING METHOD AND APPARATUS

(71) Applicant: HUAWEI TECHNOLOGIES CO., LTD., Shenzhen (CN)

(72) Inventors: Yanping Xu, Beijing (CN); Liang Xia, Shenzhen (CN); Xiaohui Tong, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/315,365

(22) Filed: May 10, 2023

(65) Prior Publication Data

US 2023/0283588 A1    Sep. 7, 2023

Related U.S. Application Data

(63) Continuation of application No. PCT/CN2021/109153, filed on Jul. 29, 2021.

(30) Foreign Application Priority Data

Nov. 11, 2020  (CN) .......................... 202011256559.2

(51) Int. Cl.
*H04L 61/5007* (2022.01)
*H04L 9/40* (2022.01)
*H04L 101/659* (2022.01)

(52) U.S. Cl.
CPC ...... *H04L 61/5007* (2022.05); *H04L 63/1416* (2013.01); *H04L 2101/659* (2022.05); *H04L 2463/146* (2013.01)

(58) Field of Classification Search
None
See application file for complete search history.

(56) References Cited

U.S. PATENT DOCUMENTS

| 8,228,896 | B2* | 7/2012 | Smith | H04L 63/123 |
| | | | | 370/351 |
| 10,498,529 | B1* | 12/2019 | Hashmi | H04L 9/0618 |
| 2006/0041568 | A1* | 2/2006 | Mahalal | H04L 63/0853 |

(Continued)

FOREIGN PATENT DOCUMENTS

| CN | 101640631 A | 2/2010 |
| CN | 102196423 A | 9/2011 |
| CN | 109981458 A | 7/2019 |
| CN | 111585890 B | 7/2021 |

OTHER PUBLICATIONS

Filsfils et al. RFC 8402: Segment Routing Architecture. Internet Engineering Task Force. 32 Pages. (Year: 2018).*

(Continued)

*Primary Examiner* — Jeffrey R Swearingen
(74) *Attorney, Agent, or Firm* — Leydig, Voit & Mayer, Ltd.

(57) ABSTRACT

A packet processing method and apparatus are provided. The method includes: on a forwarding path of an IPv6 packet, a key node (for example, a firewall) signs a packet, and a downstream apparatus of the key node verifies the signature, to determine whether the packet passes through the key node in a forwarding process. According to this application, the key node performs checking, to effectively prevent a packet which packet header is modified by attackers from bypassing the key node.

20 Claims, 4 Drawing Sheets

(56) References Cited

U.S. PATENT DOCUMENTS

| | | |
|---|---|---|
| 2016/0315819 A1 | 10/2016 | Dara et al. |
| 2018/0054417 A1* | 2/2018 | Schibuk ............... H04L 9/3242 |
| 2018/0294973 A1* | 10/2018 | Miller .................... H04L 69/22 |
| 2019/0182051 A1 | 6/2019 | Benson |
| 2020/0322266 A1 | 10/2020 | Clad et al. |
| 2020/0322380 A1 | 10/2020 | Sheth et al. |

OTHER PUBLICATIONS

Psenak et al. IS-IS Extension to Support Segment Routing over IPv6 Dataplane. draft-ietf-lsr-isis-srv6-extensions-08.txt. Apr. 23, 2020. 50 Pages. (Year: 2020).*

C. Filsfils, Ed et al., "IPv6 Segment Routing Header (SRH), draft-ietf-6man-segment-routing-header-26," Network Working Group, Internet-Draft, Total 32 pages (Oct. 22, 2019).

H. Krawczyk et al., "HMAC: Keyed-Hashing for Message Authentication," Network Working Group, Request for Comments: 2104, Total 11 pages (Feb. 1997).

C. Li et al., "Security Considerations for SRv6 Networks, draft-li-spring-srv6-security-consideration-03," Spring, Internet-Draft, Total 13 pages (Nov. 4, 2019).

C. Filsfils, Ed et al., "IPv6 Segment Routing Header (SRH), draft-ietf-6man-segment-routing-header-23," Network Working Group, Internet-Draft, Total 63 pages (Sep. 15, 2019).

C. Filsfils, Ed et al., "IPv6 Segment Routing Header (SRH)," Internet Engineering Task Force (IETF), Request for Comments: 8754, Total 27 pages (Mar. 2020).

* cited by examiner

| Type | Length | Reserved | Node type | S flag | T flag | N flag |
|------|--------|----------|-----------|--------|--------|--------|
| Sequence number ||||||||
| Timestamp ||||||||
| Nonce ||||||||
| Signature ||||||||

PACKET PROCESSING METHOD AND APPARATUS

CROSS-REFERENCE TO RELATED APPLICATIONS

This application is a continuation of International Application No. PCT/CN2021/109153, filed on Jul. 29, 2021, which claims priority to Chinese Patent Application No. 202011256559.2, filed on Nov. 11, 2020. The disclosures of the aforementioned applications are hereby incorporated by reference in their entireties.

TECHNICAL FIELD

Embodiments of this application relate to the communication field, and in particular, to a packet processing method and an apparatus.

BACKGROUND

A packet transmitted in an internet protocol version 6 (IPv6) network is referred to as an IPv6 packet. In some scenarios, to ensure network security, the IPv6 packet needs to pass through a specific key node in a forwarding process, such as a firewall node.

The IPv6 packet may be maliciously tampered with during forwarding. As a result, the IPv6 packet bypasses the key node for forwarding, resulting in some security risks. How to determine whether the IPv6 packet passes through the foregoing key node in the forwarding process is a problem to be resolved currently.

SUMMARY

Embodiments of this application provide a packet processing method and an apparatus, to determine whether an IPv6 packet passes through a specific key node in a forwarding process.

According to a first aspect, an embodiment of this application provides a packet processing method, and the method may be performed by a first communication apparatus. In an example, the first communication apparatus may obtain a first IPv6 packet, where a packet header of the first IPv6 packet includes a first signature, and it may be determined, through verification of the first signature, whether the first IPv6 packet passes through a second communication apparatus in a forwarding process. The second communication apparatus mentioned herein is a key node that the first IPv6 packet needs to pass through in the forwarding process. After obtaining the first IPv6 packet, the first communication apparatus may forward the first IPv6 packet. Because the first IPv6 packet includes the first signature for verifying whether the first IPv6 packet passes through the key node in the forwarding process, a communication apparatus that receives the first IPv6 packet may determine, by using the first signature, whether the first IPv6 packet passes through the key node in the forwarding process. It can be learned that, according to this solution, it may be determined whether the first IPv6 packet passes through the key node in the forwarding process.

In an implementation, the first IPv6 packet is an SRv6 packet. In this case, even if a node configured for performing HMAC checking is deleted from a SID list of an SRH by a network hacker, according to this solution, it may still be determined whether the first IPv6 packet passes through the second communication apparatus in the forwarding process, to effectively identify an attack packet that bypasses the key node.

In an implementation, when the first IPv6 packet is an SRv6 packet, the first signature may be carried in an SRH of the first IPv6 packet.

In an implementation, the SRH may include an extended TLV field, and the first signature may be carried in the extended TLV field.

In an implementation, hash calculation is performed based on first content in the first IPv6 packet, and a calculation result is compared with the first signature. In an example, when the first signature is a valid signature calculated by the second communication apparatus, the first signature may be obtained by the second communication apparatus by performing the hash calculation on the foregoing first content. To be specific, when forwarding the first IPv6 packet, the second communication apparatus includes the first signature in the first IPv6 packet, so that a downstream node may perform calculation based on the same content, and compare a calculation result with the first signature, to verify whether the first IPv6 packet passes through the key node in the forwarding process. In an example, when content of the first signature is inconsistent with a calculation result, a packet is discarded.

In an implementation, to reduce a possibility that the first signature is cracked, the first content may include fixed-length data in a payload of the first IPv6 packet. Data corresponding to packet payloads of different IPv6 packets is also different. Therefore, signatures are calculated by using fixed-length data in payloads of packets, so that signatures carried in the different IPv6 packets are different, and the signatures carried in the IPv6 packets are less prone to be cracked. In addition, to prevent a replay attack, the first content may further include anti-replay attack check information. In another example, the first content may include both fixed-length data in a payload of the first IPv6 packet and anti-replay attack check information.

In an implementation, if the first content includes the anti-replay attack check information, to facilitate the communication apparatus that receives the first IPv6 packet to verify the first signature, the packet header of the first IPv6 packet may further include the anti-replay attack check information. The anti-replay attack check information carried in the packet header also facilitates the communication apparatus that receives the first IPv6 packet to verify whether the first IPv6 packet is a replay packet, as well as verifying the first signature.

In an implementation, to facilitate the communication apparatus that receives the first IPv6 packet to determine a specific type of the anti-replay attack check information included in the first content, to further verify whether the first IPv6 packet is a replay packet, the packet header of the first IPv6 packet may further include first indication information, and the first indication information indicates at least one type of the anti-replay attack check information included in the first content.

In an implementation, it is considered that each of a packet sequence number, a timestamp, and a random number can prevent the replay attack. Therefore, the anti-replay attack check information may include one or more of the following: the packet sequence number, the timestamp, and the random number. The packet sequence number may be a packet sequence number allocated by the second communication apparatus to the first IPv6 packet, the timestamp may be a local timestamp, of the second communication apparatus, at which the second communication apparatus obtains the first IPv6 packet, and the random number may be a random number generated by the second communication apparatus.

In an implementation, it is considered that for a communication apparatus such as a communication apparatus 2, there is a large quantity of IPv6 packets forwarded by the communication apparatus. For the IPv6 packets forwarded by the communication apparatus, a key node that some packets thereof need to pass through in a forwarding process is a firewall device, and a key node that some other IPv6 packets need to pass through is another type of device. For different types of key nodes, keys and/or hash algorithms used by the communication apparatus 2 to verify signatures in IPv6 packets may be different. In an example, the communication apparatus 2 may determine, based on a type of a key node, a key and/or a hash algorithm for verifying a signature carried in an IPv6 packet. In this case, the packet header of the first IPv6 packet may further include second indication information, and the second indication information indicates a type of the second communication apparatus that the first IPv6 packet needs to pass through in the forwarding process.

In an implementation, the first communication apparatus and the second communication apparatus are a same apparatus, in other words, the first communication apparatus is a key node. In this case, the first IPv6 packet may be generated by the first communication apparatus. In other words, the key node generates the first signature, to obtain the first IPv6 packet including the first signature. In an example, the first communication apparatus may generate the first signature based on a first private key and a first hash algorithm of the second communication apparatus. Further, the first IPv6 packet including the first signature is generated.

In an implementation, the first communication apparatus is a downstream apparatus of the second communication apparatus on a forwarding path of the first IPv6 packet. In this case, before forwarding the first IPv6 packet, the first communication apparatus may verify the first signature based on a first public key and the first hash algorithm of the second communication apparatus. In an example, the first communication apparatus may forward the first IPv6 packet when the first signature passes the verification. This prevents an invalid packet from continuing to be transmitted in a network. In another example, when the first signature fails to pass the verification, the first IPv6 packet is discarded, to prevent a possible attack packet from continuing to be transmitted in the network and occupying a network resource.

In an implementation, the first communication apparatus may verify the first signature by using a first public key and a first hash algorithm, where the first public key and/or the first hash algorithm may be sent by a control management entity to the first communication apparatus. In this case, before verifying the first signature, the first communication apparatus may further receive the first public key and/or the first hash algorithm sent by the control management entity.

According to a second aspect, an embodiment of this application provides a packet processing method, and the method may be performed by a first communication apparatus. In an example, the first communication apparatus may receive a first IPv6 packet, verify the received first IPv6 packet, determine whether the first IPv6 packet includes a first signature of a second communication apparatus, and verify, based on a verification result, whether the first IPv6 packet passes through the second communication apparatus in a forwarding process. In an example, a packet header of the first IPv6 packet includes the first signature, and the first signature may be for verifying whether the first IPv6 packet passes through the second communication apparatus in the forwarding process. The second communication apparatus mentioned herein may be a key node that the first IPv6 packet needs to pass through in the forwarding process. After receiving the first IPv6 packet, the first communication apparatus may verify the first signature, and a verification result of the first signature is for determining whether the first IPv6 packet passes through the second communication apparatus in the forwarding process. It can be learned that, according to this solution, the first communication apparatus may determine whether the first IPv6 packet passes through the key node in the forwarding process.

In an implementation, if the first communication apparatus determines, after verifying the first signature, that the first signature fails to pass the verification, the first communication apparatus may discard the first IPv6 packet. This prevents an invalid packet from continuing to be transmitted in a network.

In an implementation, the first IPv6 packet is a segment routing internet protocol version 6 SRv6 packet.

In an implementation, the first signature is included in a segment routing header SRH.

In an implementation, the SRH includes an extended type length value TLV field, and the extended TLV field includes the first signature.

In an implementation, the first signature is obtained by performing hash calculation based on first content in the first IPv6 packet.

In an implementation, the first content includes any one or more of the following: fixed-length data in a payload and anti-replay attack check information.

In an implementation, the packet header further includes the anti-replay attack check information.

In an implementation, the packet header further includes first indication information, and the first indication information indicates at least one type of the anti-replay attack check information included in the first content.

In an implementation, the anti-replay attack check information includes one or more of the following: a packet sequence number, a timestamp, and a random number.

In an implementation, the packet header further includes second indication information, and the second indication information indicates a type of the second communication apparatus.

In an implementation, if the packet header of the first IPv6 packet includes the first indication information, the first communication apparatus may determine, based on the first indication information, at least one type of the anti-replay attack check information included in the first content. Further, an anti-replay attack check is performed based on the at least one type of the anti-replay attack check information, that is, whether the first IPv6 packet is a replay packet is verified.

In an implementation, if the first indication information indicates that the first content includes the packet sequence number, the first communication apparatus may obtain a sequence number 1 from the packet header of the first IPv6 packet, and determine whether the first communication apparatus receives, in a particular period of time, another IPv6 packet whose packet sequence number is the sequence number 1. If the first communication apparatus receives, in the particular period of time, no other IPv6 packets whose packet sequence number is the sequence number 1, it indicates that the first IPv6 packet is not a replay packet. If the first communication apparatus has received, in the particular period of time, another IPv6 packet whose packet sequence number is the sequence number 1, it indicates that the first IPv6 packet is a replay packet. If the first Pv6 packet is a replay packet, the first communication apparatus may not need to verify the first signature. This reduces resource overheads for verifying the first signature.

In an implementation, if the first indication information indicates that the first content includes the timestamp, the first communication apparatus may obtain a timestamp 1 from the packet header of the first IPv6 packet, determines a timestamp 2 at which the communication apparatus 1 receives the first IPv6 packet, and then calculates a difference between the timestamp 2 and the timestamp 1. It is considered that if the first IPv6 packet is not a replay packet, the difference between the timestamp 2 and the timestamp 1 should be less than or equal to a first threshold, in other words, a transmission delay of the first IPv6 packet between a key node 1 and the first communication apparatus is less than or equal to the first threshold. If the first IPv6 packet is a replay packet, the difference between the timestamp 2 and the timestamp 1 may be greater than the first threshold. Therefore, if the difference between the timestamp 2 and the timestamp 1 is less than or equal to the first threshold, the first communication apparatus may determine that the first IPv6 packet is not a replay packet, or if the difference between the timestamp 2 and the timestamp 1 is greater than the first threshold, the first communication apparatus may determine that the first IPv6 packet is a replay packet. If the first Pv6 packet is a replay packet, the first communication apparatus may not need to verify the first signature. This reduces resource overheads for verifying the first signature.

In an implementation, if the first indication information indicates that the first content includes the random number, the first communication apparatus may obtain a random number 1 from the packet header of the first IPv6 packet, and determine whether the first communication apparatus receives, in a particular period of time, another IPv6 packet whose carried random number is the random number 1. If the first communication apparatus receives, in the particular period of time, no other IPv6 packets whose carried random number is the random number 1, it indicates that the first IPv6 packet is not a replay packet. If the first communication apparatus has received, in the particular period of time, another IPv6 packet whose carried random number is the random number 1, it indicates that the first IPv6 packet is a replay packet. If the first Pv6 packet is a replay packet, the first communication apparatus may not need to verify the first signature. This reduces resource overheads for verifying the first signature.

In an implementation, the first signature is generated by using a first private key and a first hash algorithm of the second communication apparatus.

In an implementation, when verifying the first signature in specific implementation, the first communication apparatus may verify the first signature based on the first public key and the first hash algorithm of the second communication apparatus.

In an implementation, the method further includes: receiving the first public key and/or the first hash algorithm sent by the control management entity.

In an implementation, the first communication apparatus may verify the first signature based on an indication of the control management entity. In this case, the first communication apparatus may further receive third indication information sent by the control management entity, where the third indication information indicates the first communication apparatus to verify the first signature.

In an implementation, the first communication apparatus is a downstream apparatus of the second communication apparatus on a forwarding path of the first IPv6 packet.

In an implementation, the first communication apparatus is an egress node indicated by a SID list in the SRH of the first IPv6 packet.

According to a third aspect, this application provides a first communication apparatus, including a transceiver unit and a processing unit. The transceiver unit is configured to perform sending and receiving operations performed by the first communication apparatus according to any one of the first aspect or the implementations of the first aspect, and the processing unit is configured to perform another operation other than the sending and receiving operations performed by the first communication apparatus according to any one of the first aspect or the implementations of the first aspect.

According to a fourth aspect, this application provides a first communication apparatus, where the first communication apparatus includes a memory and a processor. The memory is configured to store program code, and the processor is configured to run instructions in the program code, to enable the first communication apparatus to perform the method according to any one of the first aspect or the implementations of the first aspect.

According to a fifth aspect, this application provides a first communication apparatus, where the first communication apparatus includes a communication interface and a processor. The communication interface is configured to perform sending and receiving operations performed by the first communication apparatus according to any one of the first aspect or the implementations of the first aspect, and the processor is configured to perform another operation other than the sending and receiving operations performed by the first communication apparatus according to any one of the first aspect or the implementations of the first aspect.

According to a sixth aspect, this application provides a first communication apparatus, including a transceiver unit and a processing unit. The transceiver unit is configured to perform sending and receiving operations performed by the first communication apparatus according to any one of the second aspect or the implementations of the second aspect, and the processing unit is configured to perform another operation other than the sending and receiving operations performed by the first communication apparatus according to any one of the second aspect or the implementations of the second aspect.

According to a seventh aspect, this application provides a first communication apparatus, where the first communication apparatus includes a memory and a processor. The memory is configured to store program code, and the processor is configured to run instructions in the program code, to enable the first communication apparatus to perform the method according to any one of the second aspect or the implementations of the second aspect.

According to an eighth aspect, this application provides a first communication apparatus, where the first communication apparatus includes a communication interface and a processor. The communication interface is configured to perform sending and receiving operations performed by the first communication apparatus according to any one of the second aspect or the implementations of the second aspect, and the processor is configured to perform another operation other than the sending and receiving operations performed by the first communication apparatus according to any one of the second aspect or the implementations of the second aspect.

According to a ninth aspect, this application provides a computer-readable storage medium, where the computer-readable storage medium stores instructions, and when the instructions are run on a computer, the computer is enabled to perform the method according to any one of the first aspect or the implementations of the first aspect, or the computer is enabled to perform the method according to any one of the second aspect or the implementations of the second aspect.

According to a tenth aspect, this application provides a communication system. The communication system includes the first communication apparatus according to the third aspect, the fourth aspect, or the fifth aspect, and the first communication apparatus according to the sixth aspect, the seventh aspect, or the eighth aspect.

BRIEF DESCRIPTION OF DRAWINGS

To describe the technical solutions in embodiments of this application or in the prior art more clearly, the following briefly describes the accompanying drawings used to describe embodiments or the prior art. It is clear that the accompanying drawings in the following descriptions show only some embodiments of this application, and persons of ordinary skill in the art may further derive another accompanying drawing based on these accompanying drawings without creative efforts.

DESCRIPTION OF EMBODIMENTS

Embodiments of this application provide a packet processing method and an apparatus, to determine whether an IPv6 packet passes through a key node in a forwarding process.

For ease of understanding, possible application scenarios of embodiments of this application are first described.

With a segment routing internet protocol version 6 (SRv6) technology, a segment routing (SR) technology may be applied to forwarding of an internet protocol version 6 (IPv6) packet. A packet forwarded by using the SRv6 technology may be referred to as an SRv6 packet.

A packet header of the SRv6 packet includes a segment routing header (SRH). The SRH includes a segment identifier list (SID list), and the SID list indicates a forwarding path of the SRv6 packet. Therefore, for the SRv6 packet, it may be determined, based on the SID list of the SRH, whether the SRv6 packet passes through a key node in a forwarding process.

However, the SRv6 packet may be tampered with in the forwarding process. In other words, the SID list of the SRv6 packet may also be tampered with in the forwarding process. If the SID list is tampered with, it cannot be accurately determined, based on the SID list, whether the SRv6 packet passes through the key node in the forwarding process.

The inventor of this application finds that, currently, it may be determined, by using a hashed-based message authentication code (HMAC) check, whether the SRH of the SRv6 packet is tampered with. Correspondingly, when the SRH is not tampered with, it is determined, based on the SID list of the SRH, whether the SRv6 packet passes through the key node in the forwarding process. For the HMAC check, refer to related descriptions in the requirement for comments RFC8754 formulated by the Internet Engineering Task Force (IETF), and details are not described herein.

However, there are some problems with this manner. For example, if a network hacker deletes a node configured to perform the HMAC check from the SID list of the SRv6 packet, in the forwarding process, the SRv6 packet no longer passes through the node configured to perform the HMAC check. Correspondingly, the node configured to perform the HMAC check cannot perform the HMAC check on the SRv6 packet any longer. As a result, validity of the SID list of the SRv6 packet cannot be determined, and it cannot be further determined, based on the SID list, whether the SRv6 packet passes through the key node in the forwarding process.

Figure 1:
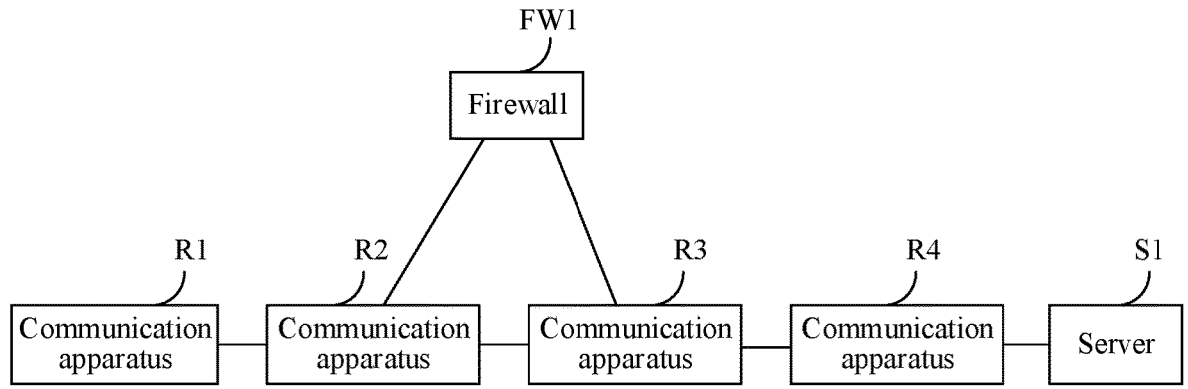
FIG. 1 is a schematic diagram of an example application scenario.

The following describes a scenario shown in FIG. 1. FIG. 1 is a schematic diagram of an example application scenario.

As shown in FIG. 1, in a normal case, a forwarding path of an SRv6 packet is a communication apparatus R1—a communication apparatus R2—a firewall FW1—a communication apparatus R3—a communication apparatus R4—a server S1. The firewall FW1 is a key node that the SRv6 packet passes through in a forwarding process. The communication apparatus R2 is configured to perform an HMAC check, to verify whether a SID list of the SRv6 packet is tampered with. However, if a network hacker modifies the SID list of the SRv6 packet, and deletes a SID of the communication apparatus R2 from the SID list, a tampered SRv6 packet is not forwarded through the communication apparatus R2 any longer. Therefore, the communication apparatus R2 also cannot perform the HMAC check on the SRv6 packet. As a result, it cannot be determined whether the SID list in the SRv6 packet is tampered with. Correspondingly, another communication apparatus also cannot determine, based on the SID list, whether the SRv6 packet passes through the key node in the forwarding process. In addition, in some examples, in addition to deleting the SID of the communication apparatus R2 from the SID list, a network hacker can also delete a SID of the firewall FW1 from the SID list. Consequently, the packet bypasses the key node (the firewall FW1) for forwarding.

To resolve the foregoing problem, embodiments of this application provide a packet processing method. The following describes the method with reference to the accompanying drawings.

Before the packet processing method provided in embodiments of this application is described, it should be noted that FIG. 1 is merely shown for ease of understanding, and does not constitute a limitation to embodiments of this application. In addition, the node configured to perform the HMAC check may be the communication device R2, or may be the communication apparatus R3, the communication apparatus R4, or a communication apparatus R5. In addition to the firewall shown in FIG. 1, the key node that the SRv6 packet needs to pass through in the forwarding process may be another type of device, for example, may be a server that prevents a denial of service (DoS) attack.

The communication apparatus mentioned in embodiments of this application may be a network device such as a switch or a router, or may be some components on a network device, for example, a board or a line card on the network device, or may be a functional module on the network device. This is not specifically limited in embodiments of this application. The communication devices may be directly connected to each other, for example, through an Ethernet cable or an optical cable.

Figure 2:
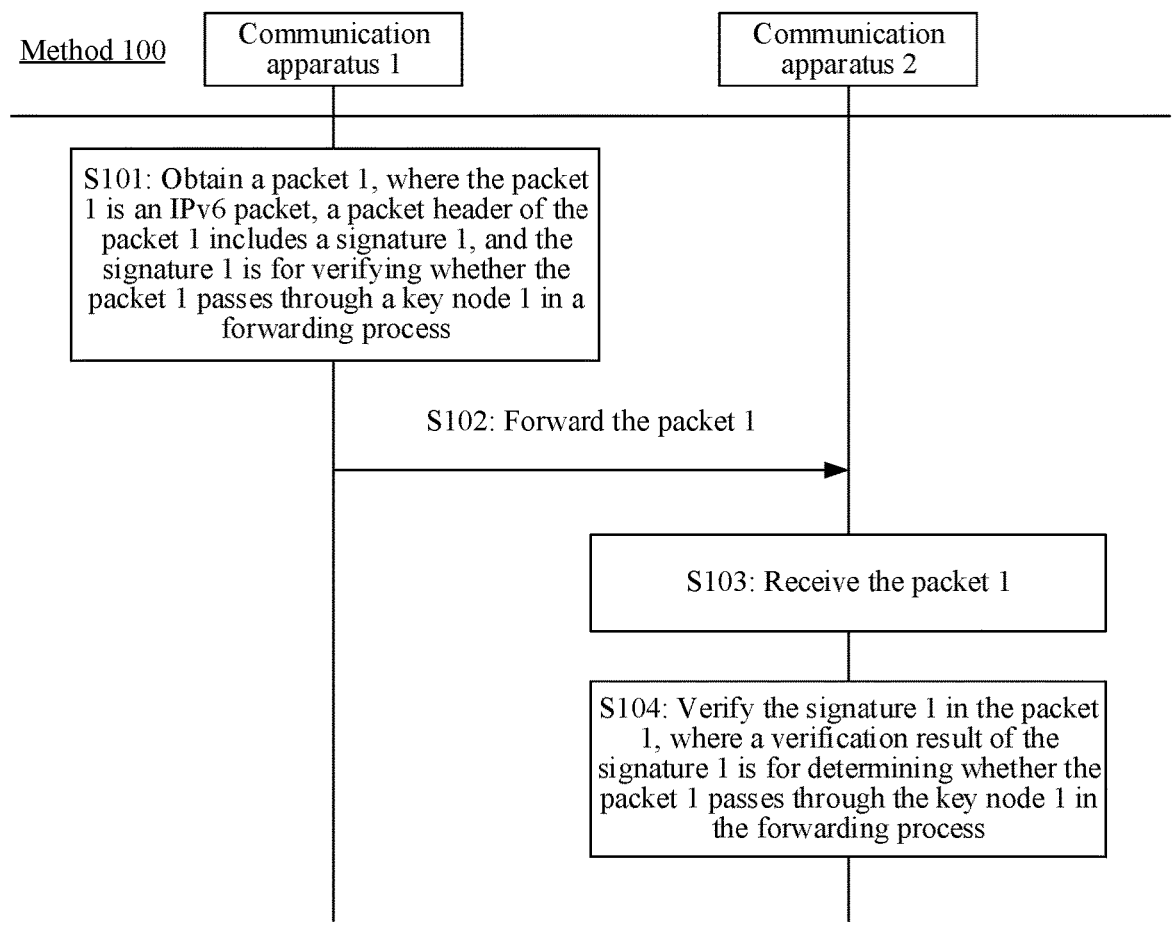
FIG. 2 is a signaling interaction diagram of a packet processing method according to an embodiment of this application.

FIG. 2 is a signaling interaction diagram of a packet processing method according to an embodiment of this application. The packet processing method 100 shown in FIG. 2 may include, for example, the following S101 to S104.

S101: A communication apparatus 1 obtains a packet 1, where the packet 1 is an IPv6 packet, a packet header of the packet 1 includes a signature 1, and the signature 1 is for verifying whether the packet 1 passes through a key node 1 in a forwarding process.

The communication apparatus 1 mentioned herein may be, for example, the firewall FW1, the communication apparatus R3, the communication apparatus R4, or the server S1 shown in FIG. 1. The key node 1 mentioned herein may be, for example, the firewall FW1 shown in FIG. 1.

In this embodiment of this application, during specific implementation, there may be a plurality of implementations in which the communication apparatus 1 obtains the packet 1.

In an example, the communication apparatus 1 serves as a downstream apparatus of the key node 1 on a forwarding path of the packet 1, and the communication apparatus 1 may receive the packet 1 sent by an upstream apparatus. The upstream apparatus mentioned herein may be, for example, the key node 1.

In an example, the communication apparatus 1 may be the key node 1, in other words, the communication apparatus 1 and the key node 1 are a same communication apparatus. In this case, the communication apparatus 1 may generate the packet 1. In an example, the communication apparatus 1 may receive a packet 2 sent by another communication apparatus, and re-encapsulate the packet 2, to obtain the packet 1 including the signature 1. In other words, after receiving the packet 2, the key node 1 signs the packet 2, to indicate that the packet 2 passes through the key node 1 in the forwarding process. After signing the packet 2, the key node 1 obtains the packet 1 including the signature 1, and the signature 1 in the packet 1 may be for determining whether the packet 1 passes through the key node 1 in the forwarding process. The packet 2 mentioned herein may alternatively be an IPv6 packet. In some embodiments, the signature 1 may be carried in an extended type length value (TLV) field of the packet 1.

In an implementation of this embodiment of this application, the signature 1 may be obtained by the key node 1 by performing hash calculation on first content in the packet 1. In an example, the key node 1 may perform calculation on the first content by using a first private key and a first hash algorithm of the key node 1, to obtain the signature 1. For example, the key node 1 may perform calculation on the first content by using the first hash algorithm, to obtain a digest 1, and then encrypt the digest 1 by using the first private key, to obtain the signature 1.

The first content is not specifically limited in embodiments of this application. In an example, to reduce a possibility that the signature 1 is cracked, the first content may include fixed-length data in a payload of the packet 1. Data corresponding to packet payloads of different IPv6 packets is also different. Therefore, signatures are calculated by using fixed-length data in payloads of packets, so that signatures carried in the different IPv6 packets are different, and the signatures carried in the IPv6 packets are less prone to be cracked. In another example, to prevent a replay attack, the first content may further include anti-replay attack check information. In still another example, the first content may include both fixed-length data in a payload of the packet 1 and anti-replay attack check information.

The anti-replay attack check information is not specifically limited in this embodiment of this application. It is considered that each of a packet sequence number, a timestamp, and a random number can prevent the replay attack. Therefore, the anti-replay attack check information may include one or more of the following: the packet sequence number, the timestamp, and the random number. The packet sequence number may be a packet sequence number allocated by the key node 1 to the packet 1, the timestamp may be a local timestamp, of the key node 1, at which the key node 1 obtains the packet 1, and the random number may be a random number generated by the key node 1.

In an implementation of this embodiment of this application, if the first content includes the anti-replay attack check information, to enable the communication apparatus that receives the packet 1 to verify the signature 1, a packet header of the packet 1 may further include the anti-replay attack check information. The anti-replay attack check information carried in the packet header may enable the communication apparatus that receives the packet 1 to verify the signature 1, and may also enable the communication apparatus that receives the packet 1 to verify whether the packet 1 is a replay packet. In an example, the anti-replay attack check information and the signature 1 may be carried in a same extended TLV field. In still another example, the anti-replay attack check information may be carried in a separate extended TLV field.

In an implementation of this embodiment of this application, to enable the communication apparatus that receives the packet 1 to determine a specific type or several specific types of the anti-replay attack verification information included in the first content, so that the communication apparatus that receives the packet 1 verifies whether the packet 1 is a replay packet, the packet header of the packet 1 may further include indication information 1, and the indication information 1 indicates at least one type of the anti-replay attack check information included in the first content. In an example, the packet header of the packet 1 includes a first flag, a second flag, and a third flag. The first flag, the second flag, and the third flag are for carrying the indication information 1. The first flag indicates whether the anti-replay attack check information included in the first content includes the packet sequence number. The second flag indicates whether the anti-replay attack check information included in the first content includes the timestamp. The third flag indicates whether the anti-replay attack check information included in the first content includes the random number.

For example, the first flag, the second flag, and the third flag each occupy one bit. When a value of the first flag is 1, it indicates that the anti-replay attack check information included in the first content includes the packet sequence number, or when a value of the first flag is 0, it indicates that the anti-replay attack check information included in the first content does not include the packet sequence number. When a value of the second flag is 1, it indicates that the anti-replay attack check information included in the first content includes the timestamp, or when a value of the second flag is 0, it indicates that the anti-replay attack check information included in the first content does not include a packet timestamp. When a value of the third flag is 1, it indicates that the anti-replay attack check information included in the first content includes the random number, or when a value of the third flag is 0, it indicates that the anti-replay attack check information included in the first content does not include the packet random number.

In an example, the anti-replay attack check information and the indication information 1 may be carried in a same extended TLV field. In another example, the indication information 1 may be carried in a separate extended TLV field.

In an implementation, it is considered that for a communication apparatus such as a communication apparatus 2, there is a large quantity of IPv6 packets forwarded by the communication apparatus. For the IPv6 packets forwarded by the communication apparatus, a key node that some packets thereof need to pass through in a forwarding process is a firewall device, and a key node that some other IPv6 packets need to pass through is another type of device, for example, a server that prevents a DoS attack. For different types of key nodes, keys and/or hash algorithm used by the communication apparatus 2 to verify signatures in IPv6 packets may be different. In an example, the communication apparatus 2 may determine, based on a type of a key node, a key and/or a hash algorithm for verifying a signature carried in an IPv6 packet. In this case, the packet header of the packet 1 may further include indication information 2, and the indication information 2 indicates a type of a key node 1 that the packet 1 needs to pass through in a forwarding process. In an example, the indication information 2 and the signature 1 may be carried in a same extended TLV field. In another example, the indication information 2 may be carried in a separate extended TLV field.

In an implementation of this embodiment of this application, the packet header of the packet 1 includes an SRH. In other words, the packet 1 may be an SRv6 packet. In an implementation, when the packet 1 is the SRv6 packet, the signature 1 may be carried in the SRH of the packet 1. In an example, the SRH of the packet 1 may include an extended TLV field, and the signature 1 may be carried in the extended TLV field.

Figures 3, 4:
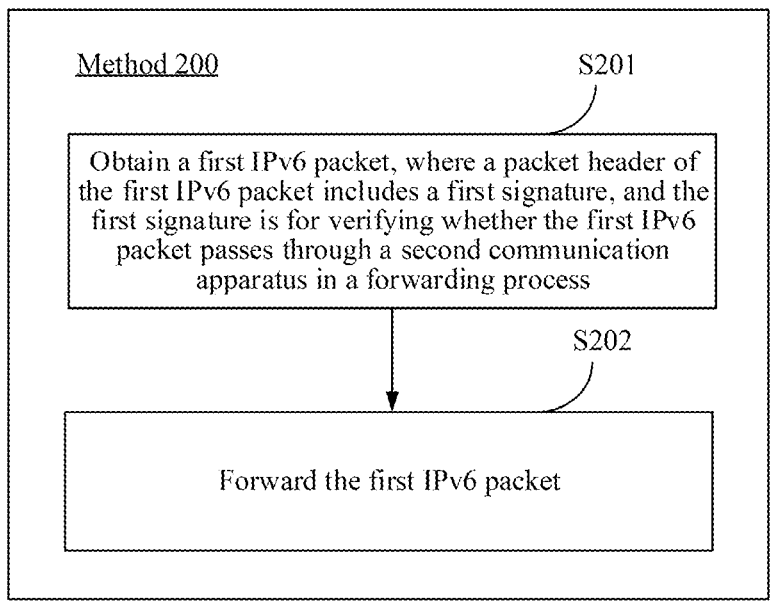
FIG. 3 is a schematic diagram of an extended TLV field according to an embodiment of this application.
FIG. 4 is a schematic flowchart of a packet processing method according to an embodiment of this application.

In an example, the signature 1, the anti-replay attack check information, the indication information 1, and the indication information 2 may be carried in a same extended TLV field. It may be understood with reference to FIG. 3. FIG. 3 is a schematic diagram of an extended TLV field according to an embodiment of this application. A node type field carries indication information 2 indicating a type of a key node 1.

An S (sequence) flag is equivalent to the first flag mentioned above, and indicates whether anti-replay attack check information included in first content includes a packet sequence number. A T (timestamp) flag is equivalent to the second flag mentioned above, and indicates whether anti-replay attack check information included in first content includes a timestamp. An N (nonce) flag is equivalent to the third flag mentioned above, and indicates whether anti-replay attack check information included in first content includes a random number.

A sequence field carries a sequence number. The sequence field is valid when the S flag indicates that the anti-replay attack check information included in the first content includes the packet sequence number. In an example, if the S flag indicates that the anti-replay attack check information included in the first content does not include the packet sequence number, the TLV field may not include the sequence field.

A timestamp field carries the timestamp. The timestamp field is valid when the S flag indicates that the anti-replay attack check information included in the first content includes the timestamp. In an example, if the S flag indicates that the anti-replay attack check information included in the first content does not include the timestamp, the TLV field may not include the timestamp field.

A nonce field carries a random number. The nonce field is valid when the N flag indicates that the anti-replay attack check information included in the first content includes the random number. In an example, if the N flag indicates that the anti-replay attack check information included in the first content does not include the random number, the TLV field may not include the nonce field.

The signature field carries the signature 1.

In an example, the extended TLV field shown in FIG. 3 may be located in an SRH. For example, the extended TLV field may be located after a SID list.

S102: A communication apparatus 1 forwards a packet 1.

S103: A communication apparatus 2 receives the packet 1.

After obtaining the packet 1, the communication apparatus 1 may forward the packet 1. As a downstream apparatus of the communication apparatus 1 on a forwarding path of the packet 1, the communication apparatus 2 may receive the packet 1 sent by the communication apparatus 1. The communication apparatus 2 mentioned herein may be the communication apparatus R3, the communication apparatus R4, or the server S1 shown in FIG. 1. In an example, when the packet 1 is an SRv6 packet, the communication apparatus 2 may be an egress node indicated by the SID list in the SRH of the packet 1. For example, the communication apparatus 2 is the server S1 shown in FIG. 1.

S104: The communication apparatus 2 verifies the signature 1 in the packet 1, where a verification result of the signature 1 is for determining whether the packet 1 passes through the key node 1 in a forwarding process.

After receiving the packet 1, the communication apparatus 2 may verify the signature 1 in the packet 1, to determine whether the packet 1 passes through the key node 1 in the forwarding process.

As described in S101, in an example, the signature 1 may be generated by the key node 1 by using a first private key and a first hash algorithm of the key node 1. Therefore, the communication apparatus 2 may verify the signature 1 by using a first public key and the first hash algorithm of the key node 1. The first public key and the first private key form a public-private key pair. In an example, the communication apparatus 2 may decrypt the signature 1 by using the first public key, to obtain a digest 2, perform hash calculation on the first content by using the first hash algorithm, to obtain a digest 3, and then perform matching on the digest 2 and the digest 3 for verification. In an example, if the digest 2 is the same as the digest 3, it is determined that the signature 1 passes a verification, or if the digest 2 is different from the digest 3, it is determined that the signature 1 fails to pass the verification.

If the signature 1 passes the verification, the communication apparatus 2 may determine that the packet 1 passes through the key node 1 in the forwarding process. In this case, for example, the communication apparatus 1 may continue to forward the packet 1. If the signature 1 fails to pass the verification, it indicates that the packet 1 is tampered with in the forwarding process. In this case, the communication apparatus 2 may discard the packet 1.

In an implementation of this embodiment of this application, the communication apparatus 2 may verify the signature 1 based on an indication of a control management entity. In other words, before verifying the signature 1, the communication apparatus 2 may further receive indication information 3 sent by the control management entity, and verify the signature 1 based on the indication information 3, where the indication information 3 indicates the communication apparatus 1 to verify the signature 1.

In an implementation of this embodiment of this application, the first public key and/or the first hash algorithm used by the communication apparatus 2 to verify the signature 1 may alternatively be sent by the control management entity to the communication apparatus 2. In other words, before verifying the signature 1, the communication apparatus 2 may further receive the first public key and/or the first hash algorithm sent by the control management entity.

The control management entity mentioned in embodiments of this application may be, for example, a device on which network management software (NMS) is run, or may be, for example, a controller. The control management entity may be a functional module that implements a control and/or management function, or may be a physical entity that runs a related functional module. For example, the physical entity may be a server installed with related software, and the related software is for implementing a function of the control management entity. This is not specifically limited in embodiments of this application.

As described above, the first content may include the anti-replay attack check information. When the first content may include the anti-replay attack check information, a packet header of the packet 1 may include the anti-replay attack check information. In this case, before verifying the signature 1, the communication apparatus 2 may further verify, based on the anti-replay attack check information, whether the packet 1 is a replay packet. If the packet 1 is a replay packet, the communication apparatus 1 may directly discard the packet 1 without performing a step of checking the signature 1. If the packet 1 is not a replay packet, the communication apparatus 2 may perform a step of verifying the signature 1.

In an example, if the packet header of the packet 1 includes indication information 1, the communication apparatus 2 may determine, based on the indication information 1, at least one type of the anti-replay attack check information included in the first content. Further, based on the at least one type of anti-replay attack check information, whether the packet 1 is a replay packet is verified.

In an example, if the indication information 1 indicates that the first content includes the packet sequence number, the communication apparatus 2 may obtain a sequence number 1 from the packet header of the packet 1, and determine whether the communication apparatus 2 receives, in a particular period of time, another IPv6 packet whose packet sequence number is the sequence number 1. If the communication apparatus 2 receives, in the particular period of time, no other IPv6 packets whose packet sequence number is the sequence number 1, it indicates that the packet 1 is not a replay packet. If the communication apparatus 2 has received, in the particular period of time, another IPv6 packet whose packet sequence number is the sequence number 1, it indicates that the packet 1 is a replay packet.

In an implementation, the communication apparatus 2 may locally store a packet sequence number of an IPv6 packet received in a particular period of time, and compare the sequence number 1 with the pre-stored packet sequence number. If the pre-stored packet sequence number includes the sequence number 1, it indicates that the communication apparatus 2 has received, in the particular period of time, the another IPv6 packet whose packet sequence number is the sequence number 1. If the pre-stored packet sequence number does not include the sequence number 1, it indicates that the communication apparatus 2 receives, in the particular period of time, no other IPv6 packets whose packet sequence number is the sequence number 1.

In an example, if the indication information 1 indicates that the first content includes the timestamp, the communication apparatus 2 may obtain a timestamp 1 from the packet header of the packet 1, determine a timestamp 2 at which the communication apparatus 2 receives the packet 1, and then calculate a difference between the timestamp 2 and the timestamp 1. It is considered that if the packet 1 is not a replay packet, the difference between the timestamp 2 and the timestamp 1 should be less than a first threshold, in other words, a transmission delay of the packet 1 between the key node 1 and the communication apparatus 2 is less than the first threshold. If the packet 1 is a replay packet, the difference between the timestamp 2 and the timestamp 1 may be greater than or equal to the first threshold. Therefore, if the difference between the timestamp 2 and the timestamp 1 is less than the first threshold, the communication apparatus 2 may determine that the packet 1 is not a replay packet, or if the difference between the timestamp 2 and the timestamp 1 is greater than or equal to the first threshold, the communication apparatus 2 may determine that the packet 1 is a replay packet. The timestamp 2 is a local timestamp, of the communication apparatus 2, at which the communication apparatus 2 receives the packet 1.

In an example, if the indication information 1 indicates that the first content includes the random number, the communication apparatus 2 may obtain a random number 1 from the packet header of the packet 1, and determine whether the communication apparatus 2 receives, in a particular period of time, another IPv6 packet whose carried random number is the random number 1. If the communication apparatus 2 receives, in the particular period of time, no IPv6 packets whose carried random number is the random number 1, it indicates that the packet 1 is not a replay packet. If the communication apparatus 2 has received, in the particular period of time, another IPv6 packet whose carried random number is the random number 1, it indicates that the packet 1 is a replay packet.

In an implementation, the communication apparatus 2 may locally store the random number carried in an IPv6 packet received in a particular period of time, and compare the random number 1 with the pre-stored random number. If the pre-stored random number includes the random number 1, it indicates that the communication apparatus 2 has received, in a particular period of time, the another IPv6 packet whose carried random number is the random number 1. If the pre-stored random number does not include the random number 1, it indicates that the communication apparatus 2 receives, in a particular period of time, no other IPv6 packets whose carried random number is the random number 1.

As described above, the communication apparatus 1 and the key node 1 may be a same apparatus, or may be different apparatuses. When the communication apparatus 1 and the key node are different apparatuses, the communication apparatus 1 may be a downstream apparatus of the key node 1 on the forwarding path of the packet 1. In this case, before forwarding the packet 1, the communication apparatus 1 may further verify the signature 1, and forward the packet 1 when the signature 1 passes the verification. For specific implementation in which the communication apparatus 1 verifies the signature 1, refer to the foregoing descriptions in which the communication apparatus 2 verifies the signature 1 in S104. Details are not described herein again.

It can be learned from the foregoing descriptions that, by using the method 100, the downstream apparatus of the key node 1 on the forwarding path of the packet 1 may verify the signature 1, to determine whether the packet 1 passes through the key node 1 in the forwarding process. When the packet 1 is the SRv6 packet, the method 100 can overcome the problem mentioned in the descriptions of FIG. 1 that, because the node configured to perform the HMAC check is deleted from the SID list of the SRH by a network hacker, whether the packet 1 passes through the key node 1 in the forwarding process cannot be determined through the SID list.

FIG. 4 is a schematic flowchart of a packet processing method according to an embodiment of this application. The packet processing method 200 shown in FIG. 4 may be performed by a first communication apparatus. The first communication apparatus may be the communication apparatus 1 in the foregoing embodiment, and is configured to perform the steps performed by the communication apparatus 1 in the foregoing method 100. For example, the method 200 may include the following S201 and S202.

S201: A first IPv6 packet is obtained, where a packet header of the first IPv6 packet includes a first signature, and the first signature is for verifying whether the first IPv6 packet passes through a second communication apparatus in a forwarding process.

S202: The first IPv6 packet is forwarded.

The first IPv6 packet mentioned herein may correspond to the packet 1 in the method 100, the first signature mentioned herein may correspond to the signature 1 in the method 100, and the second communication apparatus mentioned herein may correspond to the key node 1 in the method 100.

In an implementation, the first IPv6 packet is a segment routing internet protocol version 6 SRv6 packet.

In an implementation, the first signature is included in a segment routing header SRH.

In an implementation, the SRH includes an extended type length value TLV field, and the extended TLV field includes the first signature.

In an implementation, the first signature is obtained by performing hash calculation based on first content in the first IPv6 packet.

In an implementation, the first content includes one or more of the following:

fixed-length data in a payload and anti-replay attack check information.

In an implementation, the packet header further includes the anti-replay attack check information.

In an implementation, the packet header further includes first indication information, and the first indication information indicates at least one type of the anti-replay attack check information included in the first content.

The first indication information mentioned herein may correspond to the indication information 1 in the method 100.

In an implementation, the anti-replay attack check information includes one or more of the following:

a packet sequence number, a timestamp, and a random number.

In an implementation, the packet header further includes second indication information, and the second indication information indicates a type of the second communication apparatus.

The second indication information mentioned herein may correspond to the indication information 2 in the method 100.

In an implementation, the first communication apparatus and the second communication apparatus are a same apparatus, and the obtaining a first IPv6 packet includes:

The first signature is generated based on a first private key of the second communication apparatus.

In an implementation, the first communication apparatus is a downstream apparatus of the second communication apparatus on a forwarding path of the first IPv6 packet, and before the forwarding the first IPv6 packet, the method further includes:

The first signature is verified based on a first public key of the second communication apparatus.

In an implementation, the first public key and/or a first hash algorithm needed for signature calculation that are/is sent by a control management entity are/is received.

Figure 5:
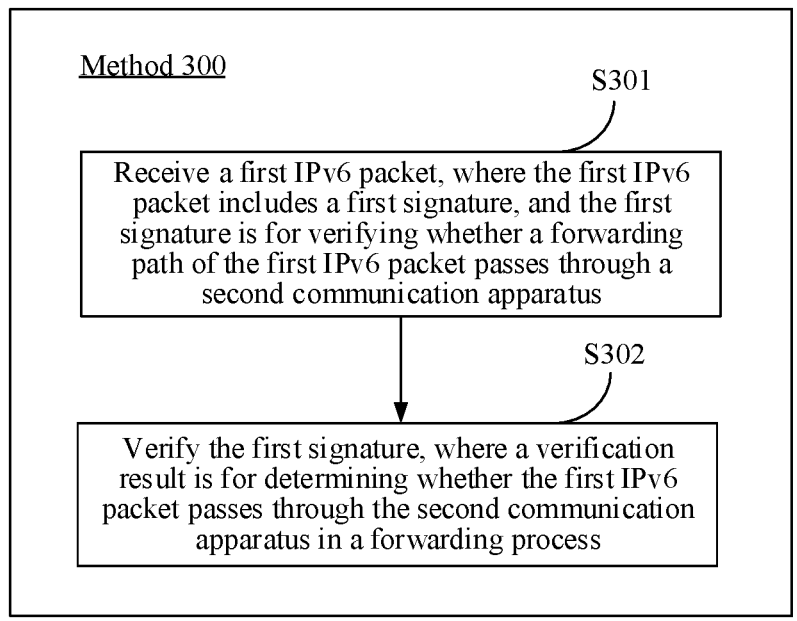
FIG. 5 is a schematic flowchart of a packet processing method according to an embodiment of this application.

FIG. 5 is a schematic flowchart of a packet processing method according to an embodiment of this application. The packet processing method 300 shown in FIG. 5 may be performed by a first communication apparatus. The first communication apparatus may be the communication apparatus 2 in the foregoing embodiment, and is configured to perform the steps performed by the communication apparatus 2 in the foregoing method 100. For example, the method 300 may include the following S301 and S302.

S301: A first IPv6 packet is received, where the first IPv6 packet includes a first signature, and the first signature is for verifying whether a forwarding path of the first IPv6 packet passes through a second communication apparatus.

S302: The first signature is verified, where a verification result is for determining whether the first IPv6 packet passes through the second communication apparatus in the forwarding process.

The first IPv6 packet mentioned herein may correspond to the packet 1 in the method 100, the first signature mentioned herein may correspond to the signature 1 in the method 100, and the second communication apparatus mentioned herein may correspond to the key node 1 in the method 100.

In an implementation, the method further includes:

The first IPv6 packet is discarded if the verification fails.

In an implementation, the first IPv6 packet is a segment routing internet protocol version 6 SRv6 packet.

In an implementation, the first signature is included in a segment routing header SRH.

In an implementation, the SRH includes an extended type length value TLV field, and the extended TLV field includes the first signature.

In an implementation, the first signature is obtained by performing hash calculation based on first content in the first IPv6 packet.

In an implementation, the first content includes any one or more of the following:

fixed-length data in a payload and anti-replay attack check information.

In an implementation, the packet header further includes the anti-replay attack check information.

In an implementation, the packet header further includes first indication information, and the first indication information indicates at least one type of the anti-replay attack check information included in the first content.

The first indication information mentioned herein may correspond to the indication information 1 in the method 100.

In an implementation, the anti-replay attack check information includes one or more of the following:

a packet sequence number, a timestamp, and a random number.

In an implementation, the packet header further includes second indication information, and the second indication information indicates a type of the second communication apparatus.

The second indication information mentioned herein may correspond to the indication information 2 in the method 100.

In an implementation, if the first indication information indicates that the first content includes the packet sequence number, before the verifying the first signature, the method further includes:

It is determined that the first communication apparatus receives, in a particular period of time, no other IPv6 packets whose sequence number is the same as the sequence number carried in the first IPv6 packet.

In an implementation, if the first indication information indicates that the first content includes the timestamp, before the verifying the first signature, the method further includes:

A first timestamp at which the first communication apparatus receives the first IPv6 packet is obtained; and it is determined that a difference between the first timestamp and the timestamp carried in the first IPv6 packet is less than a first threshold.

In an implementation, if the first indication information indicates that the first content includes the random number, before the verifying the first signature, the method further includes:

It is determined that the first communication apparatus receives, in a particular period of time, no other IPv6 packets whose carried random number is the same as the random number carried in the first IPv6 packet.

In an implementation, the first signature is generated by using a first private key of the second communication apparatus.

In an implementation, the verifying the first signature includes:

The first signature is verified based on a first public key of the second communication apparatus.

In an implementation, the method further includes:

The first public key and/or a first hash algorithm needed for signature calculation that are/is sent by a control management entity are/is received.

In an implementation, the method further includes:

Third indication information sent by the control management entity is received, where the third indication information indicates the first communication apparatus to verify the first signature.

The third indication information mentioned herein may correspond to the indication information 3 in the method 100.

In an implementation, the first communication apparatus is a downstream apparatus of the second communication apparatus on a forwarding path of the first IPv6 packet.

In an implementation, the first communication apparatus is an egress node indicated by a SID list in the SRH of the first IPv6 packet.

For specific implementation of the foregoing method 200 and the method 300, refer to the foregoing descriptions of the method 100. Details are not described herein again.

Figure 6:
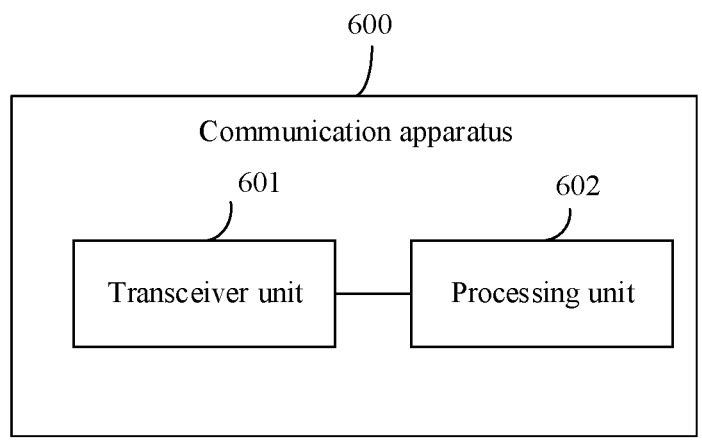
FIG. 6 is a schematic diagram of a structure of a communication apparatus according to an embodiment of this application.

In addition, an embodiment of this application further provides a communication apparatus 600, as shown in FIG. 6. FIG. 6 is a schematic diagram of a structure of a communication apparatus according to an embodiment of this application. The communication apparatus 600 includes a transceiver unit 601 and a processing unit 602. The communication apparatus 600 may be configured to perform the method 100, the method 200, or the method 300 in the foregoing embodiments.

In an example, the communication apparatus 600 may perform the method 100 in the foregoing embodiments. When the communication apparatus 600 is configured to perform the method 100 in the foregoing embodiments, the communication apparatus 600 is equivalent to the communication apparatus 1 in the method 100. The transceiver unit 601 is configured to perform sending and receiving operations performed by the communication apparatus 1 in the method 100. The processing unit 602 is configured to perform an operation performed by the communication apparatus 1 in the method 100 other than the sending and receiving operations. For example, the processing unit 602 is configured to obtain a packet 1, where the packet 1 is an IPv6 packet, a packet header of the packet 1 includes a signature 1, and the signature 1 is for verifying whether the packet 1 passes through a key node 1 in a forwarding process. The transceiver unit 601 is configured to forward the packet 1.

In an example, the communication apparatus 600 may perform the method 100 in the foregoing embodiments. When the communication apparatus 600 is configured to perform the method 100 in the foregoing embodiments, the communication apparatus 600 is equivalent to the communication apparatus 2 in the method 100. The transceiver unit 601 is configured to perform sending and receiving operations performed by the communication apparatus 2 in the method 100. The processing unit 602 is configured to perform an operation performed by the communication apparatus 2 in the method 100 other than the sending and receiving operations. For example, the transceiver unit 601 is configured to receive a packet 1, where the packet 1 is an IPv6 packet, a packet header of the packet 1 includes a signature 1, and the signature 1 is for verifying whether the packet 1 passes through a key node 1 in a forwarding process. The processing unit 602 is configured to verify the signature 1 in the packet 1, and a verification result of the signature 1 is for determining whether the packet 1 passes through the key node 1 in a forwarding process.

In an example, the communication apparatus 600 may perform the method 200 in the foregoing embodiments. When the communication apparatus 600 is configured to perform the method 200 in the foregoing embodiments, the communication apparatus 600 is equivalent to the first communication apparatus in the method 200. The transceiver unit 601 is configured to perform sending and receiving operations performed by the first communication apparatus in the method 200. The processing unit 602 is configured to perform an operation performed by the first communication apparatus in the method 200 other than the sending and receiving operations. For example, the processing unit 602 is configured to obtain a first internet protocol version 6 IPv6 packet, where a packet header of the first IPv6 packet includes a first signature, and the first signature is for verifying whether the first IPv6 packet passes through a second communication apparatus in a forwarding process. The transceiver unit 601 is configured to forward the first IPv6 packet.

In an example, the communication apparatus 600 may perform the method 300 in the foregoing embodiments. When the communication apparatus 600 is configured to perform the method 300 in the foregoing embodiments, the communication apparatus 600 is equivalent to the first communication apparatus in the method 300. The transceiver unit 601 is configured to perform sending and receiving operations performed by the first communication apparatus in the method 300. The processing unit 602 is configured to perform an operation performed by the first communication apparatus in the method 300 other than the sending and receiving operations. For example, the transceiver unit 601 is configured to receive a first IPv6 packet, where the first IPv6 packet includes a first signature, and the first signature is for verifying whether a forwarding path of the first IPv6 packet passes through a second communication apparatus. The processing unit 602 is configured to verify the first signature, where a verification result is for determining whether the first IPv6 packet passes through the second communication apparatus in a forwarding process.

Figure 7:
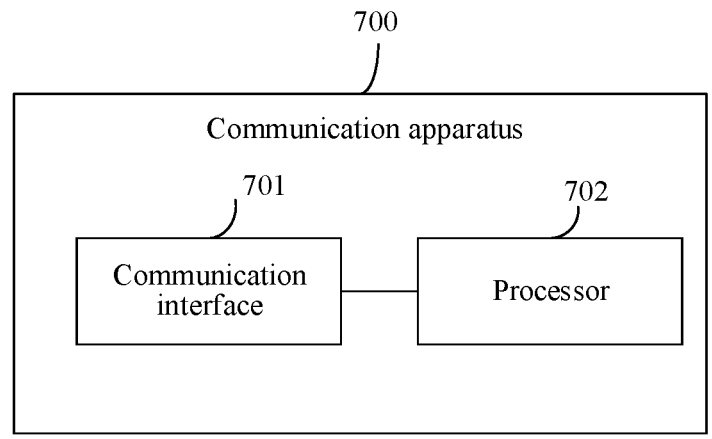
FIG. 7 is a schematic diagram of a structure of a communication apparatus according to an embodiment of this application.

In addition, an embodiment of this application further provides a communication apparatus 700. FIG. 7 is a schematic diagram of a structure of a communication apparatus according to an embodiment of this application. The communication apparatus 700 includes a communication interface 701 and a processor 702 connected to the communication interface 701. The communication apparatus 700 may be configured to perform the method 100, the method 200, or the method 300 in the foregoing embodiments.

In an example, the communication apparatus 700 may perform the method 100 in the foregoing embodiments. When the communication apparatus 700 is configured to perform the method 100 in the foregoing embodiments, the communication apparatus 700 is equivalent to the communication apparatus 1 in the method 100. The communication interface 701 is configured to perform sending and receiving operations performed by the communication apparatus 1 in the method 100. The processor 702 is configured to perform an operation performed by the communication apparatus 1 in the method 100 other than the sending and receiving operations. For example, the processor 702 is configured to obtain a packet 1, where the packet 1 is an IPv6 packet, a packet header of the packet 1 includes a signature 1, and the signature 1 is for verifying whether the packet 1 passes through a key node 1 in a forwarding process. The communication interface 701 is configured to forward the packet 1.

In an example, the communication apparatus 700 may perform the method 100 in the foregoing embodiments. When the communication apparatus 700 is configured to perform the method 100 in the foregoing embodiments, the communication apparatus 700 is equivalent to the communication apparatus 2 in the method 100. The communication interface 701 is configured to perform sending and receiving operations performed by the communication apparatus 2 in the method 100. The processor 702 is configured to perform an operation performed by the communication apparatus 2 in the method 100 other than the sending and receiving operations. For example, the communication interface 701 is configured to receive a packet 1, where the packet 1 is an IPv6 packet, a packet header of the packet 1 includes a signature 1, and the signature 1 is for verifying whether the packet 1 passes through a key node 1 in a forwarding process. The processor 702 is configured to verify the signature 1 in the packet 1, and a verification result of the signature 1 is for determining whether the packet 1 passes through the key node 1 in a forwarding process.

In an example, the communication apparatus 700 may perform the method 200 in the foregoing embodiments. When the communication apparatus 700 is configured to perform the method 200 in the foregoing embodiments, the communication apparatus 700 is equivalent to the first communication apparatus in the method 200. The communication interface 701 is configured to perform sending and receiving operations performed by the first communication apparatus in the method 200. The processor 702 is configured to perform an operation performed by the first communication apparatus in the method 200 other than the sending and receiving operations. For example, the processor 702 is configured to obtain a first internet protocol version 6 IPv6 packet, where a packet header of the first IPv6 packet includes a first signature, and the first signature is for verifying whether the first IPv6 packet passes through a second communication apparatus in a forwarding process. The communication interface 701 is configured to forward the first IPv6 packet.

In an example, the communication apparatus 700 may perform the method 300 in the foregoing embodiments. When the communication apparatus 700 is configured to perform the method 300 in the foregoing embodiments, the communication apparatus 700 is equivalent to the first communication apparatus in the method 300. The communication interface 701 is configured to perform sending and receiving operations performed by the first communication apparatus in the method 300. The processor 702 is configured to perform an operation performed by the first communication apparatus in the method 300 other than the sending and receiving operations. For example, the communication interface 701 is configured to receive a first IPv6 packet, where the first IPv6 packet includes a first signature, and the first signature is for verifying whether a forwarding path of the first IPv6 packet passes through a second communication apparatus. The processor 702 is configured to verify the first signature, where a verification result is for determining whether the first IPv6 packet passes through the second communication apparatus in a forwarding process.

Figure 8:
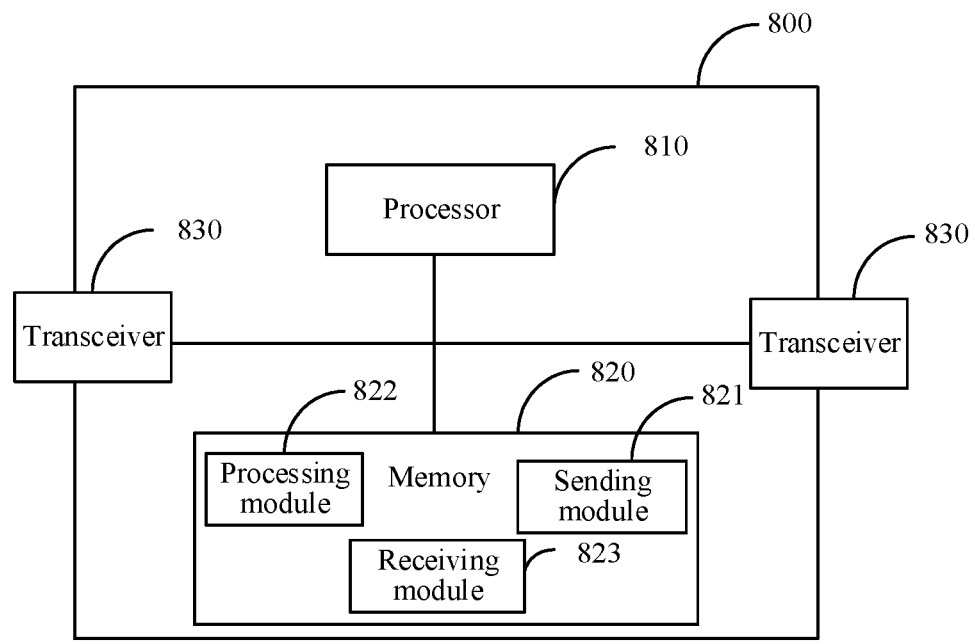
FIG. 8 is a schematic diagram of a structure of a communication apparatus according to an embodiment of this application.

In addition, an embodiment of this application further provides a communication apparatus 800. FIG. 8 is a schematic diagram of a structure of a communication apparatus according to an embodiment of this application.

The communication apparatus 800 may be configured to perform the method 100, the method 200, or the method 300 in the foregoing embodiments.

As shown in FIG. 8, the communication apparatus 800 may include a processor 810, a memory 820 coupled to the processor 810, and a transceiver 830. The transceiver 830 may be, for example, a communication interface, an optical module, or the like. The processor 810 may be a central processing unit (CPU), a network processor (NP), or a combination of a CPU and an NP. A processor may alternatively be an application-specific integrated circuit (ASIC), a programmable logic device (PLD) or a combination thereof. The PLD may be a complex programmable logic device (CPLD), a field-programmable logic gate array (FPGA), generic array logic (GAL) or any combination thereof. The processor 810 may be one processor, or may include a plurality of processors. The memory 820 may include a volatile memory, such as a random-access memory (RAM), or the memory may further include a non-volatile memory, such as a read-only memory (ROM), a flash memory, a hard disk drive (HDD), or a solid-state drive (SSD). The memory 820 may further include a combination of the foregoing types of memories. The memory 820 may be one memory, or may include a plurality of memories. In an implementation, the memory 820 stores computer-readable instructions, and the computer-readable instructions include a plurality of software modules, for example, a sending module 821, a processing module 822, and a receiving module 823. After executing each software module, the processor 810 may perform a corresponding operation based on an indication of each software module. In this embodiment, an operation performed by a software module is actually an operation performed by the processor 810 based on an indication of the software module.

In an example, the communication apparatus 800 may perform the method 100 in the foregoing embodiments. When the communication apparatus 800 is configured to perform the method 100 in the foregoing embodiments, the communication apparatus 800 is equivalent to the communication apparatus 1 in the method 100. The transceiver 830 is configured to perform sending and receiving operations performed by the communication apparatus 1 in the method 100. The processor 810 is configured to perform an operation performed by the communication apparatus 1 in the method 100 other than the sending and receiving operations. For example, the processor 810 is configured to obtain a packet 1, where the packet 1 is an IPv6 packet, a packet header of the packet 1 includes a signature 1, and the signature 1 is for verifying whether the packet 1 passes through a key node 1 in a forwarding process. The transceiver 830 is configured to forward the packet 1.

In an example, the communication apparatus 800 may perform the method 100 in the foregoing embodiments. When the communication apparatus 800 is configured to perform the method 100 in the foregoing embodiments, the communication apparatus 800 is equivalent to the communication apparatus 2 in the method 100. The transceiver 830 is configured to perform sending and receiving operations performed by the communication apparatus 2 in the method 100. The processor 810 is configured to perform an operation performed by the communication apparatus 2 in the method 100 other than the sending and receiving operations. For example, the transceiver 830 is configured to receive a packet 1, where the packet 1 is an IPv6 packet, a packet header of the packet 1 includes a signature 1, and the signature 1 is for verifying whether the packet 1 passes through a key node 1 in a forwarding process. The processor 810 is configured to verify the signature 1 in the packet 1, and a verification result of the signature 1 is for determining whether the packet 1 passes through the key node 1 in a forwarding process.

In an example, the communication apparatus 800 may perform the method 200 in the foregoing embodiments. When the communication apparatus 800 is configured to perform the method 200 in the foregoing embodiments, the communication apparatus 800 is equivalent to the first communication apparatus in the method 200. The transceiver 830 is configured to perform sending and receiving operations performed by the first communication apparatus in the method 200. The processor 810 is configured to perform an operation performed by the first communication apparatus in the method 200 other than the sending and receiving operations. For example, the processor 810 is configured to obtain a first internet protocol version 6 IPv6 packet, where a packet header of the first IPv6 packet includes a first signature, and the first signature is for verifying whether the first IPv6 packet passes through a second communication apparatus in a forwarding process. The transceiver 830 is configured to forward the first IPv6 packet.

In an example, the communication apparatus 800 may perform the method 300 in the foregoing embodiments. When the communication apparatus 800 is configured to perform the method 300 in the foregoing embodiments, the communication apparatus 800 is equivalent to the first communication apparatus in the method 300. The transceiver 830 is configured to perform sending and receiving operations performed by the first communication apparatus in the method 300. The processor 810 is configured to perform an operation performed by the first communication apparatus in the method 300 other than the sending and receiving operations. For example, the transceiver 830 is configured to receive a first IPv6 packet, where the first IPv6 packet includes a first signature, and the first signature is for verifying whether a forwarding path of the first IPv6 packet passes through a second communication apparatus. The processor 810 is configured to verify the first signature, where a verification result is for determining whether the first IPv6 packet passes through the second communication apparatus in a forwarding process.

This application further provides a computer-readable storage medium. The computer-readable storage medium stores instructions. When the instructions are run on a computer, the computer is enabled to perform any one or more operations in the method (for example, the method 100, the method 200, or the method 300) in any one of the foregoing embodiments.

This application further provides a computer program product, including a computer program. When the computer program is run on a computer, the computer is enabled to perform any one or more operations in the method (for example, the method 100, the method 200, or the method 300) in any one of the foregoing embodiments.

This application further provides a communication system, including any first communication apparatus for performing the method 200 and any first communication apparatus for performing the method 300 mentioned in the foregoing embodiments. The communication system may further include the foregoing control management entity, configured to implement an operation performed by the control management entity in the foregoing embodiments.

This application further provides a communication system, including at least one memory and at least one processor, where the at least one memory stores instructions, and the at least one processor performs the instructions, so that the communication system performs any one or more operations in the method (for example, the method 100, the method 200, or the method 300) in any one of the foregoing embodiments.

In the specification, claims, and accompanying drawings of this application, the terms "first", "second", "third", "fourth", and the like (if used) are intended to distinguish between similar objects but do not necessarily indicate a specific order or sequence. It should be understood that the data termed in such a way are interchangeable in proper circumstances, so that embodiments of the present invention described herein can be implemented in other orders than the order illustrated or described herein. In addition, the terms "include", "have" and any other variants thereof are intended to cover non-exclusive inclusion. For example, a process, method, system, product, or device that includes a list of steps or units is not necessarily limited to those steps or units that are expressly listed, but may include other steps or units that are not expressly listed or inherent to the process, method, product, or device.

Persons skilled in the art may clearly understand that, for the purpose of convenient and brief description, for detailed working processes of the foregoing system, apparatus, and unit, refer to corresponding processes in the foregoing method embodiments. Details are not described herein again.

In several embodiments provided in this application, it should be understood that the disclosed system, apparatus, and method may be implemented in another manner. For example, the described apparatus embodiments are merely examples. For example, division into units is merely logical service division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical, a mechanical, or another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objectives of the solutions of the embodiments.

In addition, service units in embodiments of this application may be integrated into one processing unit, or each of the units may exist alone physically, or two or more units may be integrated into one unit. The integrated unit may be implemented in a form of hardware, or may be implemented in a form of a software service unit.

When the integrated unit is implemented in the form of a software service unit and sold or used as an independent product, the integrated unit may be stored in a computer-readable storage medium. Based on such an understanding, the technical solutions of this application essentially, or a part contributing to a conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

Persons skilled in the art should be capable of being aware that, in the foregoing one or more examples, services described in the present invention may be implemented by using hardware, software, firmware, or any combination thereof. When the services are implemented by using the software, the services may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or a dedicated computer.

The objectives, technical solutions, and beneficial effects of the present invention have been further described in detail in the foregoing specific implementations. It should be understood that the foregoing descriptions are merely specific implementations of the present invention.

The foregoing embodiments are merely for describing instead of limiting the technical solutions of this application. Although this application is described in detail with reference to the foregoing embodiments, persons of ordinary skill in the art should understand that they may still make modifications to the technical solutions set forth in the foregoing embodiments or make equivalent replacements to some technical features thereof, and these modifications or replacements do not enable the essence of corresponding technical solutions to depart from the scope of the technical solutions of embodiments of this application.

What is claimed is:

1. A packet processing method, performed by a first communication apparatus, and the method comprising:
    obtaining a first internet protocol version 6 (IPv6) packet, wherein a packet header of the first IPV6 packet comprises a first signature, and the first signature is for verifying whether the first IPv6 packet passes through a second communication apparatus in a forwarding process;
    forwarding the first IPV6 packet;
    wherein the first signature which is determined by fixed-length data in payloads of the first IPv6 packet uniquely identifies the first IPV6 packet, and is different from signatures of other IPv6 packets; and
    wherein the first signature is obtained by performing hash calculation based on first content in the first IPV6 packet, and the first content comprises the fixed-length data in the payload and anti-replay attack check information.

2. The method according to claim 1, wherein the first IPV6 packet is a segment routing internet protocol version 6 (SRv6) packet.

3. The method according to claim 2, wherein the first signature is comprised in a segment routing header (SRH).

4. The method according to claim 3, wherein the SRH comprises an extended type length value (TLV) field, and the extended TLV field comprises the first signature.

5. The method according to claim 1, wherein the packet header further comprises the anti-replay attack check information.

6. The method according to claim 1, wherein the packet header further comprises first indication information, and the first indication information indicates at least one type of the anti-replay attack check information comprised in the first content.

7. The method according to claim 5, wherein the anti-replay attack check information comprises one or more of the following:
    a packet sequence number, a timestamp, and a random number.

8. The method according to claim 1, wherein the packet header further comprises second indication information, and the second indication information indicates a type of the second communication apparatus.

9. The method according to claim 1, wherein the first communication apparatus and the second communication apparatus are a same apparatus, and the obtaining the first IPv6 packet comprises:
    generating the first signature based on a first private key of the second communication apparatus.

10. The method according to claim 1, wherein the first communication apparatus is a downstream apparatus of the second communication apparatus on a forwarding path of the first IPV6 packet, and before the forwarding the first IPV6 packet, the method further comprises:
verifying the first signature based on a first public key of the second communication apparatus.

11. The method according to claim 10, further comprising: receiving the first public key sent by a control management entity.

12. A packet processing method, performed by a first communication apparatus, and the method comprising:
receiving a first internet protocol version 6 (IPv6) packet, wherein the first IPv6 packet comprises a first signature, and the first signature is for verifying whether a forwarding path of the first IPV6 packet passes through a second communication apparatus;
verifying the first signature, and processing the first IPV6 packet based on a verification result;
wherein the first signature which is determined by fixed-length data in payloads of the first IPv6 packet uniquely identifies the first IPv6 packet and is different from signatures of other IPv6 packets; and
wherein the first signature is obtained by performing hash calculation based on first content in the first IPV6 packet, and the first content comprises the fixed-length data in the payload and anti-replay attack check information.

13. The method according to claim 12, further comprising:
discarding the first IPV6 packet in response to a failure of the verification.

14. The method according to claim 12, wherein the first IPV6 packet is a segment routing internet protocol version 6 (SRv6) packet.

15. The method according to claim 14, wherein the first signature is comprised in a segment routing header (SRH).

16. The method according to claim 15, wherein the SRH comprises an extended type length value (TLV) field, and the extended TLV field comprises the first signature.

17. The method according to claim 12, wherein the packet header further comprises the anti-replay attack check information.

18. The method according to claim 12, wherein the packet header further comprises first indication information, and the first indication information indicates at least one type of the anti-replay attack check information comprised in the first content.

19. The method according to claim 17, wherein the anti-replay attack check information comprises one or more of the following:
a packet sequence number, a timestamp, and a random number.

20. The method according to claim 12, wherein the packet header further comprises second indication information, and the second indication information indicates a type of the second communication apparatus.

* * * * *

UNITED STATES PATENT AND TRADEMARK OFFICE
CERTIFICATE OF CORRECTION

PATENT NO. : 12,224,978 B2
APPLICATION NO. : 18/315365
DATED : February 11, 2025
INVENTOR(S) : Xu et al.

It is certified that error appears in the above-identified patent and that said Letters Patent is hereby corrected as shown below:

In the Claims

Claim 1: Column 24, Lines 22-33: "wherein a packet header of the first IPV6 packet comprises a first signature, and the first signature is for verifying whether the first IPv6 packet passes through a second communication apparatus in a forwarding process; forwarding the first IPV6 packet; wherein the first signature which is determined by fixed-length data in payloads of the first IPv6 packet uniquely identifies the first IPv6 packet, and is different from signatures of other IPv6 packets; and wherein the first signature is obtained by performing hash calculation based on first content in the first IPV6" should read as -- wherein a packet header of the first IPv6 packet comprises a first signature, and the first signature is for verifying whether the first IPv6 packet passes through a second communication apparatus in a forwarding process; forwarding the first IPv6 packet; wherein the first signature which is determined by fixed-length data in payloads of the first IPv6 packet uniquely identifies the first IPv6 packet, and is different from signatures of other IPv6 packets; and wherein the first signature is obtained by performing hash calculation based on first content in the first IPv6 --.

Claim 2: Column 24, Line 38: "IPV6 packet is a segment routing internet protocol version" should read as -- IPv6 packet is a segment routing internet protocol version --.

Claim 10: Column 25, Lines 4-5: "the first IPV6 packet, and before the forwarding the first IPV6 packet, the method further comprises:" should read as -- the first IPv6 packet, and before the forwarding the first IPv6 packet, the method further comprises: --.

Claim 12: Column 25, Lines 16-26: "forwarding path of the first IPV6 packet passes through a second communication apparatus; verifying the first signature, and processing the first IPV6 packet based on a verification result; wherein the first signature which is determined by fixed-length data in payloads of the first IPv6 packet uniquely identifies the first IPv6 packet and is different from signatures of other IPv6 packets; and wherein the first signature is obtained by performing hash calculation based on first content in the first IPV6" should read as -- forwarding path of the first IPv6 packet passes through a second communication apparatus; verifying the first signature, and processing the first IPv6 packet based on a verification result; wherein the first signature which is Signed and Sealed this
Fifth Day of August, 2025

Coke Morgan Stewart
*Acting Director of the United States Patent and Trademark Office*

CERTIFICATE OF CORRECTION (continued)
U.S. Pat. No. 12,224,978 B2 determined by fixed-length data in payloads of the first IPv6 packet uniquely identifies the first IPv6 packet and is different from signatures of other IPv6 packets; and wherein the first signature is obtained by performing hash calculation based on first content in the first IPv6 --.

Claim 13: Column 26, Line 3: "discarding the first IPV6 packet in response to a failure of" should read as -- discarding the first IPv6 packet in response to a failure of --.

Claim 14: Column 26, Line 6: "IPV6 packet is a segment routing internet protocol version" should read as -- IPv6 packet is a segment routing internet protocol version --.